(12) United States Patent
Otsuji et al.

(10) Patent No.: US 7,561,295 B2
(45) Date of Patent: Jul. 14, 2009

(54) INFORMATION MANAGEMENT APPARATUS, INFORMATION OUTPUT SYSTEM, PORTABLE TERMINAL, AND INFORMATION OUTPUTTING METHOD

(75) Inventors: Kiyotaka Otsuji, Kamakura (JP); Toshiki Iso, Yokosuka (JP); Hiroki Suzuki, Yokohama (JP); Shoji Kurakake, Yokohama (JP); Toshiaki Sugimura, Yokohama (JP); Hidenori Shimizu, Hachioji (JP); Taro Sugahara, Tokyo (JP); Fumitoshi Ukai, Tokyo (JP); Hironori Bouno, Tokyo (JP); Kei Yuasa, Mountain View, CA (US); Marc McEachern, Tokyo (JP); Shinya Nakagawa, Mitaka (JP)

(73) Assignees: NTT DoCoMo, Inc., Tokyo (JP); Hewlett-Packard Company, Palo Alto, CA (US)

( * ) Notice: Subject to any disclaimer, the term of this patent is extended or adjusted under 35 U.S.C. 154(b) by 1092 days.

(21) Appl. No.: 10/780,566

(22) Filed: Feb. 19, 2004

(65) Prior Publication Data
US 2004/0212827 A1 Oct. 28, 2004

(30) Foreign Application Priority Data
Feb. 27, 2003 (JP) ............................. 2003-051865

(51) Int. Cl.
*G06F 15/00* (2006.01)
*G06F 1/00* (2006.01)
(52) U.S. Cl. .................... 358/1.16; 358/1.13; 358/1.14; 358/1.15
(58) Field of Classification Search ....... 358/1.13–1.16, 358/302; 400/62; 705/27
See application file for complete search history.

(56) References Cited

U.S. PATENT DOCUMENTS

| 5,726,431 | A | 3/1998 | Vandonkelaar et al. |
| 5,754,981 | A | 5/1998 | Veeneman et al. |
| 6,721,465 | B1 | 4/2004 | Nakashima et al. |
| 6,990,489 | B2 * | 1/2006 | Kondo et al. ................... 707/8 |
| 7,014,374 | B2 * | 3/2006 | Hamaguchi et al. ........... 400/62 |
| 7,194,253 | B2 * | 3/2007 | Ritter et al. .............. 455/414.1 |

(Continued)

FOREIGN PATENT DOCUMENTS

CN       1346474 A       4/2002

(Continued)

*Primary Examiner*—Edward L Coles
*Assistant Examiner*—Satwant K Singh
(74) *Attorney, Agent, or Firm*—Oblon, Spivak, McClelland, Maier & Neustadt, P.C.

(57) ABSTRACT

An information management apparatus 50 according to the present invention comprises: a database 30*d* for storing information relevant to a printer 40 therein; output request reception means 20*a* for receiving an output request transmitted from a portable terminal 14; inquiry signal transmission means 20*a* for transmitting an inquiry signal on the printer 40 being an output destination to the portable terminal 14; communication means for receiving image data transmitted from the portable terminal 14; recognition means 30*b* for recognizing the identification information of the printer 40 by analyzing the image data transmitted in response to the inquiry signal; retrieval means 30*c* for retrieving the information relevant to the printer 40 from the data base 30*d* on the basis of the acquired recognition information; and printing means 20*c* for outputting the information to the printer 40 on the basis of the information relevant to the printer 40 retrieved by the retrieval means 30*c*.

6 Claims, 7 Drawing Sheets

U.S. PATENT DOCUMENTS

| | | | |
|---|---|---|---|
| 7,333,227 B2 * | 2/2008 | Seto | 358/1.15 |
| 7,345,780 B2 * | 3/2008 | Seto | 358/1.15 |
| 2002/0054328 A1 * | 5/2002 | Konishi | 358/1.15 |
| 2002/0165801 A1 * | 11/2002 | Stern et al. | 705/27 |
| 2002/0186412 A1 * | 12/2002 | Murashita | 358/1.16 |

FOREIGN PATENT DOCUMENTS

| | | |
|---|---|---|
| CN | 2508466 Y | 8/2002 |
| JP | 11-53581 | 2/1999 |
| JP | 2001-331660 | 11/2001 |
| JP | 2002-49934 | 2/2002 |
| JP | 2002-135451 | 5/2002 |
| JP | 2002-312270 | 10/2002 |
| KR | 2000-0023515 | 4/2000 |
| KR | 1020010007990 A | 2/2001 |
| KR | 2001-0101343 | 11/2001 |
| KR | 10-0359720 | 10/2002 |
| WO | WO 99/21071 | 4/1999 |
| WO | WO 0051046 | 8/2000 |
| WO | WO 01/33366 A1 | 5/2001 |
| WO | WO 01/42894 A1 | 6/2001 |

* cited by examiner

Fig.7
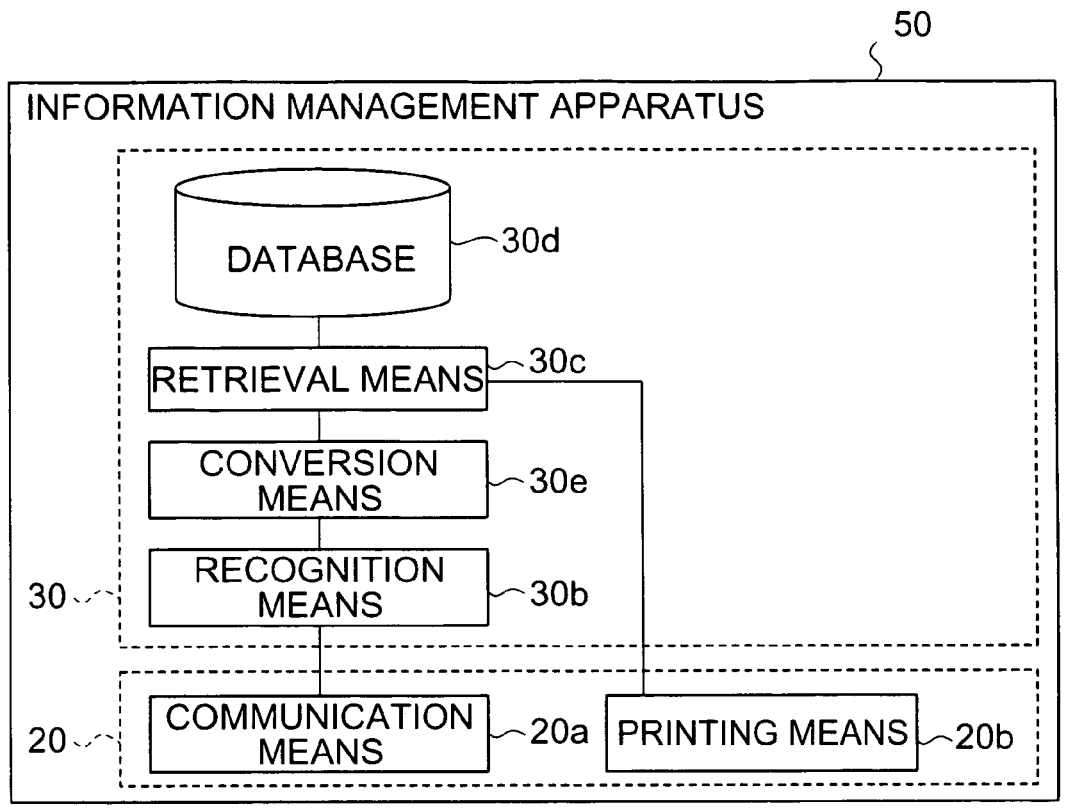
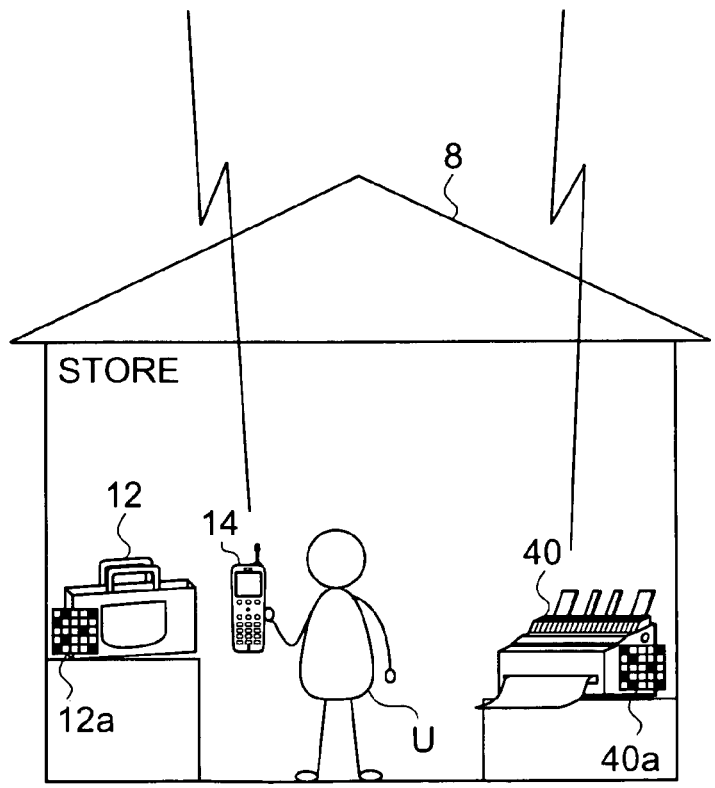

INFORMATION MANAGEMENT APPARATUS, INFORMATION OUTPUT SYSTEM, PORTABLE TERMINAL, AND INFORMATION OUTPUTTING METHOD

BACKGROUND OF THE INVENTION

1. Field of the Invention

The present invention relates to an information output apparatus, an information output system, a portable terminal for use in the information output system, and information outputting method, in which an object and the information of the same are connected with each other on a three-dimensional space to achieve an output service for information of the object with the aid of a virtual drag and drop operation.

2. Related Background Art

Many systems for realizing services for outputting information have been proposed until now. Since these services are often provided generally in relation to an object, it is desired to provide a system for providing information associated with the object.

Hereupon, there are known a variety of techniques to instruct to have a predetermined processing applied on certain data on a computer. A technique called "drag and drop" is known as one of these techniques. In the technique "drag and drop", data to be processed is dragged and dropped on an icon for signifying a predetermined processing, whereby the predetermined processing is executed on the predetermined data. Herein, the drag means "selecting and moving" executed using chiefly a pointing device such as a mouse. The drop means the release of the selection of data having been selected using a mouse, which is realized in many cases by releasing a button of the mouse generally.

For example, when a certain file is desired to be printed, a mouse cursor is moved onto an icon indicative of the file, and a mouse button is depressed to "select" the file, and further the mouse is moved as it is to achieve the "drag" operation. The file is more over moved on to an icon indicative of a printer, and then the mouse button is released to achieve the drop operation. With such a processing, a service, "print" is provided for the "file".

Reference 1 discloses a technique wherein a three-dimensional icon is moved onto a virtual space on a computer with the drag and drop operation, and the three-dimensional icon is displayed on the virtual space. Reference 2 discloses a technique wherein a three-dimensional object is moved onto a virtual space on a computer with the drag and drop operation. With this technique, a plurality of users share the virtual space on the computer.

[Reference 1] Japanese Patent Publication Laid-Open No.H11-053581

[Reference 2] Japanese Patent Publication Laid-Open No. 2002-049934

SUMMARY OF THE INVENTION

As disclosed in references 1 and 2, there are conventionally known a drag and drop operation in a computer and a drag and drop operation on a virtual space in a computer.

Such a drag and drop operation is a convenient technique to link a "service" to an "object", so that it is preferable to realize such a drag and drop operation even on a real three-dimensional space.

However, for a drag and drop operation on a real three-dimensional space any effective technique is not yet known.

In view of the drawbacks with the prior art, it is an object of the present invention to provide an information output apparatus, an information output system, a portable terminal for use in the information output system, and a information outputting method, wherein a drag and drop operation on a real three-dimensional space is realized, and for example information relevant to goods can be printed with a printer.

An information management apparatus according to the present invention provides:

output apparatus information storage means for storing information relevant to an output apparatus for outputting information, with the stored information linked with identification information for identifying the output apparatus;

output request receiving means for receiving an output request for information transmitted from a portable terminal;

inquiry signal transmission means for transmitting an inquiry signal for inquiring said portable terminal of an output apparatus for an output destination, when an output request is received by the output request receiving means;

image data receiving means for receiving image data transmitted from the portable terminal;

identification information acquisition means for analyzing image data transmitted from the portable terminal in response to the inquiry signal and received by the image data receiving means, and for acquiring identification information relevant to an output apparatus involved in the image data;

output destination information retrieval means for retrieving the information relevant to the output apparatus from the output apparatus information storage means based upon the identification information acquired by the identification information acquisition means; and information output means for, based upon the information relevant to the particular output apparatus retrieved by the output destination information retrieval means, outputting the information to the particular output apparatus.

Therefore, the information management apparatus performs acquiring the identification information involved in the image data transmitted from the portable terminal, retrieving an output apparatus being a destination to be outputted from the output information storage means on the basis of the identification information, and outputting the information from the output apparatus on the basis on the information retrieved. Hereby, a user can specify the desired output apparatus being a destination to be outputted, with photographing the identification information of the output apparatus, and transmitting it to the information management apparatus.

The aforementioned information management apparatus may be further provide:

goods information storage means for storing information relevant to goods, with the stored information linked to identification information for identifying the goods;

identification information acquisition means for analyzing image data received by the image data receiving means, and for acquiring identification information of goods involved in image data; and goods information retrieval means for retrieving the information relevant to the goods from the goods information storage means based upon the identification information acquired by the identification information acquisition means, wherein, the information output means outputs the information relevant to the goods retrieved by the goods information retrieval means.

Thus, the information management apparatus performs acquiring the identification information involved in the image data transmitted from the portable terminal, retrieving an output apparatus being a destination to be outputted from the goods information storage means on the basis of the identification information, and outputting the information retrieved.

Hereby, a user can output the information of the goods with photographing the identification information of goods desired to know detailed information, and transmitting the identification information of the goods to the information management apparatus. Moreover, the information management apparatus performs specifying an output apparatus being a destination to be outputted, so that a user can output the goods information from the output apparatus, with photographing the identification information of the apparatus after photographing the identification information of the goods, and can output information with realizing the drag and drop operation in a real three-dimensional space.

An information management apparatus according to the present invention provides:

information storage means for storing information relevant to an output apparatus for outputting information, with the stored information linked to global identification information tagged uniformly to the output apparatus and different kinds of goods;

output request receiving means for receiving an output request of information transmitted from a portable terminal;

inquiry signal transmission means for transmitting an inquiry signal for inquiring said portable terminal of an output apparatus for an output destination, when an output request is received by the output request receiving means;

image data receiving means for receiving image data transmitted from the portable terminal;

identification information acquisition means for analyzing image data transmitted from the portable terminal in response to the inquiry signal and received by the image data receiving means, and for acquiring identification information relevant to an output apparatus involved in the image data;

converting means for converting identification information of the output apparatus acquired by the identification information acquisition means into global identification information;

information retrieval means for retrieving information relevant to the output apparatus from the information storage means based upon the global identification information converted by the converting means; and information output means for, based upon the information relevant to the particular output apparatus retrieved by the output destination information retrieval means, outputting the information to the particular output apparatus.

The information management apparatus is thus further adapted such that the identification information involved in the image data transmitted from the portable terminal is acquired, on the basis of which the information of the output apparatus being an output destination is retrieved from the information storage means, on the basis of which the information is outputted from the output apparatus. A user can hereby specify the output apparatus being an output destination, and output the information. Herein, the "global identification information" refers to one for uniformly treating varieties of pieces of identification information used globally generally. In accordance with the present invention, the information storage means can uniformly treat various apparatuses and goods because it stores information while linking it to such global identification information.

The aforementioned information management apparatus may provide:

the information storage means further stores information relevant to goods, with the stored information linked to the global identification information;

the identification information acquisition means analyzes image data received by the image data receiving means, and acquires identification information of goods involved in the image data;

the converting means converts identification information of goods acquired by the identification information acquisition means into global identification information;

the information retrieval means retrieves information relevant to the goods from the information storage means based upon the global identification information converted by the converting means; and the information output means outputs information relevant to goods retrieved by the information retrieval means.

The information management apparatus is thus adapted such that the identification information involved in the image data transmitted from the portable terminal is acquired, on the basis of which information relevant to goods is retrieved from the goods information storage means, and the retrieved goods information is outputted. A user can output the information of goods, detailed information of which is desired to be known, by photographing the identification information of the goods, and transmitting it to the information management apparatus. Further, the information management apparatus is adapted such that an output apparatus being an output destination can be specified by photographing the identification information of the output apparatus serving to output goods information, and transmitting it to the information management apparatus. A user can output the goods information from the output apparatus by photographing the identification information of the goods, and then photographing the identification information of the output apparatus, and can therefore output information by realizing a drag and drop operation in a real three-dimensional space. In the present invention, since the information storage means has stored information while linking it to the global identification information, varieties of apparatuses and goods can be uniformly treated.

An information management apparatus according to the present invention provides:

output apparatus information storage means for storing information relevant to an output apparatus for outputting information, with the stored information linked to identification information for identifying the output apparatus;

output request receiving means for receiving image data transmitted from a portable terminal and an output request for information;

identification information acquisition means for analyzing the image data received by the output request receiving means, and for acquiring identification information of an output apparatus involved in the image data;

output destination information retrieval means for retrieving the information relevant to the output apparatus from the output apparatus information storage means based upon the identification information acquired by the identification information acquisition means; and information output means for, based upon the information relevant to the particular output apparatus retrieved by the output destination information retrieval means, outputting the information to the particular output apparatus.

The information management apparatus is thus adapted such that the identification information involved in the image data transmitted from the portable terminal is acquired, on the basis of which the information of the output apparatus being an output destination is in turn retrieved from the output information storage means, on the basis of which the information is outputted from the output apparatus. A user can hereby specify the output apparatus being the output destination to output the information by photographing the identification information of the output apparatus, information of which is thereupon desired to be outputted, and transmitting it to the information management apparatus. A user can further reduce the number of times of transmission and reception between the portable terminal and the information management apparatus by receiving the image information for specifying the output destination together with the output request.

A portable terminal including photographing means according to the present invention provides:

output request transmission means for transmitting an output request for information to an information management apparatus which allows an output apparatus to output the information;

inquiry signal receiving means for receiving an inquiry signal transmitted from the information management apparatus in response to the output request for inquiring said portable terminal of an output apparatus for an output destination; and image data transmission means for transmitting identification information tagged to the output apparatus for identifying this particular output apparatus and image data photographed with the photographing means to the information management apparatus, when an inquiry signal is received by the inquiry signal receiving means.

In the portable terminal including the photographing means for the inquiry signal from the information management apparatus the identification information of the desired output apparatus is photographed to transmit the image data. Hereby, the output apparatus being an output destination can be specified.

In the foregoing portable terminal, the image data transmission means may transmit identification information tagged to goods for identifying this particular goods and image data photographed with the photographing means to the information management apparatus.

In the portable terminal including the photographing means as described above, the identification information of goods, detailed information of which is desired to be known, is photographed, and the image data is transmitted, whereby a desired goods can be specified.

A portable terminal according to the present invention provides:

photographing means for photographing identification information to obtain image data, the identification information being tagged to an output apparatus for identifying this particular output apparatus; and output request transmission means for transmitting image data photographed by the photographing means and an output request for information to an information management apparatus which allows to output information.

The portable terminal is adapted as described above such that the identification information of a desired output apparatus is photographed, and the image data is transmitted. Hereby, the output apparatus of an output destination can be specified.

An information output system according to the present invention provides the foregoing information management apparatus and the foregoing portable terminal.

The information output system provides the information management apparatus and the portable terminal is adapted as described above. Hereby, the output apparatus of an output destination for information can be specified by transmitting the imager data. Further, the identification information of the output apparatus is photographed after image data of the identification information of goods is transmitted, and the image data is transmitted. Hereby, the goods information can be outputted from the output apparatus, and hence a drag and drop operation in a real three-dimensional space can be realized, and the information can be outputted.

An information output system according to the present invention has an output apparatus for outputting information and an information management apparatus connecting each other through a network, in which the information management apparatus includes an output apparatus information storage means for storing information relevant to the output apparatus and identifies an output apparatus based on information transmitted from a portable terminal to have this particular output information, wherein, the portable terminal provides:

identification acquisition means for acquiring identification information of the output apparatus; and identification information transmission means for transmitting identification information acquired by the identification information acquisition means to the information management apparatus, and the information management apparatus provides:

identification information receiving means for receiving identification information transmitted from the portable terminal;

output destination information retrieval means for retrieving information relevant to the output apparatus from the output apparatus information storage means based upon identification information received by the identification information receiving means; and information output means for, based upon the information relevant to the particular output apparatus retrieved by the output destination information retrieval means, outputting the information to the particular output apparatus.

The portable terminal is adapted to comprise the identification information acquisition means, and the identification information of the output apparatus acquired by the identification information acquisition means is transmitted, as described above. Hereby, the information output destination can be specified with ease.

In the information output system, the identification information acquisition means included in the portable terminal is preferably means for acquiring the identification information of the output apparatus with the aid of the output apparatus and proximate distance radio communication. As the method for the proximate distance radio communication with the use of high frequency and infrared rays is useable. Further, communication may be allowed using the Bluetooth.

An information outputting method in an information output system according to the present invention having an output apparatus for outputting information and an information management apparatus connecting each other through a network, in which the information management apparatus includes an output apparatus information storage means for storing information relevant to the output apparatus and specifies an output apparatus to output information based upon information transmitted from a portable terminal, provides:

an output request transmission step for transmitting an output request for information from the portable terminal to the information management apparatus receiving it;

an inquiry signal transmission step for transmitting an inquiry signal which the information management apparatus inquires an output apparatus being a destination to be outputted, to the portable terminal receiving it, when the information management apparatus receives the output request in the output request transmission step;

an image data transmission step for transmitting image data of identification information tagged to an output apparatus for identifying it, photographed by the portable terminal, when the portable terminal receives the inquiry signal in the inquiry signal transmission step;

identification information acquisition step for analyzing image data received by the information management apparatus in the image data transmission step, and for acquiring the identification information of the output apparatus involved in the image data;

an output destination information retrieval step for retrieving the information relevant to the output apparatus from the output apparatus information storage means using the information management apparatus, based upon the identification information acquired in the identification information acquisition step; and an information output step for allowing the output apparatus to output information using the information management apparatus, based upon the information relevant to the particular output apparatus retrieved by the output destination information retrieval step, outputting the information to the particular output apparatus.

The identification information involved in the image data transmitted from the portable terminal is acquired, on the basis of which the information of the output apparatus being an output destination from the output information storage means is retrieved, on the basis of which the information is outputted from the output apparatus. A user hereby can specify an output apparatus being an output destination, and output information by photographing the identification of an output apparatus to which information is desired to be outputted, and transmitting it to the information management apparatus.

An information outputting method in an information output system according to the present invention having an output apparatus for outputting goods information and an information management apparatus connecting each other through a network, in which the information management apparatus includes an output apparatus information storage means for storing information relevant to the output apparatus and goods information storage means for storing information relevant to goods, and specifies an output apparatus to output information based upon information transmitted from a portable terminal, provides:

a first image data transmission step for transmitting image data of identification information tagged to goods for identifying it, photographed by the portable terminal, to the information management apparatus receiving it;

a first identification information acquisition step for analyzing image data received by the information management apparatus in the first image data transmission step, and for acquiring the identification information of the goods involved in the image data;

goods information retrieval step for retrieving the information relevant to the goods from the goods information storage means using the information management apparatus, based upon the identification information acquired in the first identification information acquisition step;

an output request transmission step for transmitting an output request for the information relevant to the goods using the portable terminal to the information management apparatus receiving it;

an inquiry signal transmission step for transmitting an inquiry signal for inquiring said portable terminal of an output apparatus for an output destination, from the information management apparatus to the portable terminal receiving it, when the information management apparatus receives the inquiry signal in the output request transmission step;

a second image data transmission step for transmitting image data of identification information tagged to an output apparatus for identifying it, photographed by the portable terminal, to the information management apparatus receiving it, when the portable terminal receives the inquiry signal in the inquiry signal transmission step;

a second identification information acquisition step for analyzing image data received by the information management apparatus in the second image data transmission step, and for acquiring the identification information of the goods involved in the image data;

an output destination information retrieval step for retrieving the information relevant to the output apparatus from the output apparatus information storage means using the information management apparatus, based upon the identification information acquired in the second identification information acquisition step; and an information output step for outputting the information relevant to the goods, retrieved in the goods information retrieval step, using the information management apparatus, based upon the information relevant to the particular output apparatus retrieved by the output destination information retrieval step, outputting the information to the particular output apparatus.

The identification information involved in the image data transmitted from the portable terminal is acquired, on the basis of which the information relevant to goods from the goods information storage means is retrieved, and the retrieved information of the goods is outputted, as described above. A user can hereby output the information of the goods by photographing the identification information of goods, detailed information of which is desired to be known, and transmitting it to the image management apparatus. Further, since an output apparatus being an output destination can be specified by photographing the identification information of an output apparatus for outputting goods information, and transmitting it to the information management apparatus, a user can output the goods information from the output apparatus by photographing the identification information of goods and then photographing the output apparatus. Hereby the user can output the information by realizing a drag and drop operation in a real three-dimensional space.

A information outputting method in an information output system according to the present invention having an output apparatus for outputting information and an information management apparatus connecting each other through a network, in which the information management apparatus includes an information storage means for storing information relevant to the output apparatus, linking global identification information uniformly tagged to any output apparatus and to different kinds of goods, and specifies an output apparatus to output information based upon information transmitted from a portable terminal, provides:

an output request transmission step for transmitting an output request for information from the portable terminal to the information management apparatus receiving it;

an inquiry signal transmission step for transmitting an inquiry signal which the information management apparatus inquires an output apparatus being a destination to be outputted, to the portable terminal receiving it, when the information management apparatus receives the output request in the output request transmission step;

an image data transmission step for transmitting image data of identification information tagged to an apparatus for identifying it, photographed by the portable terminal, when the portable terminal receives the inquiry signal in the inquiry signal transmission step;

an identification information acquisition step for analyzing image data received by the information management apparatus in the image data transmission step, and for acquiring the identification information of the output apparatus involved in the image data;

a converting step for converting the identification information of the output apparatus, acquired in the identification information acquisition step, into the global identification information;

an information retrieval step for retrieving the information relevant to the output apparatus from the information storage means using the information management apparatus, based upon the global identification information converted in the converting step; and an information output step for allowing the output apparatus to output information using the information management apparatus, based upon the information relevant to the particular output apparatus retrieved by the output destination information retrieval step, outputting the information to the particular output apparatus.

The identification information involved in the image data transmitted from the portable terminal is acquired, on the basis of which the information of an output apparatus being an output destination from the information storage means is retrieved, on the basis of which information is outputted from the output apparatus, as described above. A user can output the information by specifying the output apparatus being an output destination by photographing the identification information of an output apparatus to which the information is outputted, and transmitting it to the information management apparatus. Herein, "global identification information" refers to identification information for uniformly processing varieties of identification information used widely in the world. According to the present invention since the information storage means stores information linking it to the global identification information, various apparatuses and goods can be uniformly treated.

An information outputting method in an information output system according to the present invention having an output apparatus for outputting information and an information management apparatus connecting each other through a network, in which the information management apparatus includes an information storage means for storing information relevant to the output apparatus and to goods, linking global identification information uniformly tagged to any output apparatus and to different kinds of goods, and specifies an output apparatus to output information based upon information transmitted from a portable terminal, provides:

a first image data transmission step for transmitting image data of identification information tagged to goods for identifying it, photographed by the portable terminal, to the information management apparatus receiving it;

a first identification information acquisition step for analyzing image data received by the information management apparatus in the first image data transmission step, and for acquiring the identification information of the goods involved in the image data;

a first converting step for converting identification information of the goods acquired in the first identification information acquisition step into global identification information;

a first information retrieval step for retrieving the information relevant to the goods from the information storage means using the information management apparatus, based upon the global identification information converted in the first converting step;

an output request transmission step for transmitting an output request for the information relevant to the goods using the portable terminal to the information management apparatus receiving it;

an inquiry signal transmission step for transmitting an inquiry signal, for inquiring said portable terminal of an output apparatus for an output destination, from the information management apparatus to the portable terminal receiving it, when the information management apparatus receives the inquiry signal in the output request transmission step;

a second image data transmission step for transmitting image data of identification information tagged to an output apparatus for identifying it, photographed by the portable terminal, to the information management apparatus receiving it, when the portable terminal receives the inquiry signal in the inquiry signal transmission step;

a second identification information acquisition step for analyzing image data received by the information management apparatus in the second image data transmission step, and for acquiring the identification information of the output apparatus involved in the image data;

a second converting step for converting the identification information of the output apparatus acquired in the second identification information acquisition step into global identification information;

a second information retrieval step for retrieving the information relevant to the output apparatus from the information storage means using the information management apparatus, based upon the global identification information converted in the second converting step; and an information output step for outputting the information relevant to the goods, retrieved in the first information retrieval step, using the information management apparatus, based upon the information relevant to the output apparatus retrieved in the second information retrieval step.

The identification information involved in image data transmitted from the portable terminal is acquired, on the basis of which information relevant to goods from the goods information storage means is retrieved, and the retrieved information is outputted, as described above. A user can acquire the information of the goods by photographing the goods, detailed information of which is desired to be known, and transmitting it to the information management apparatus. Further, since an output apparatus being an output destination can be specified by photographing the identification information of an output apparatus for outputting the goods information, and transmitting it to the information management apparatus, a user can output the goods information from the output apparatus by photographing the identification information of the goods, and then photographing the apparatus, and hence can output the information by realizing a drag and drop operation in a real three-dimensional space. In accordance with the present invention, since the information storage means stores information linking it to the global identification information, varieties of apparatuses and goods can be uniformly treated.

A information outputting method in an information output system according to the present invention having an output apparatus for outputting information and an information management apparatus connecting each other through a network, in which the information management apparatus includes an output apparatus information storage means for storing information relevant to the output apparatus and specifies an output apparatus to output information based upon information transmitted from a portable terminal, provides:

an image data photographing step for obtaining image data of identification information tagged to an output apparatus identifying it, photographed by the portable;

an output request transmission step for transmitting the image data photographed in the image data photographing step and an output request for information, from the portable terminal to the information management apparatus receiving them;

an identification information acquisition step for analyzing the image data transmitted in the output request transmission step, and for acquiring the identification information of the output apparatus involved in the image data;

an output destination information retrieval step for retrieving the information relevant to the output apparatus from the output apparatus information storage means, based upon the identification information acquired in the identification information acquisition step; and an information output step for outputting the information to the output apparatus, based upon the information relevant to the particular output apparatus retrieved by the output destination information retrieval step, outputting the information to the particular output apparatus.

The identification information involved in the image data transmitted from the portable terminal is acquired, on the basis of which the information of an output apparatus being an output destination is retrieved from the output information storage means, on the basis of which information is outputted from the output apparatus, as described above. A user can hereby output the information by specifying the output apparatus being the output destination by photographing the identification information of an output apparatus to which the output is desired to be outputted, and transmitting it to the information management apparatus. Further, the number of times of transmission and reception between the portable terminal and the information management apparatus can be reduced.

A information outputting method according to the present invention having an output apparatus for outputting information and an information management apparatus connecting each other through a network, in which the information management apparatus includes an output apparatus information storage means for storing information relevant to the output apparatus and specifies an output apparatus to output information based upon information transmitted from a portable terminal, provides:

an identification information acquisition step for acquiring identification information of the output apparatus using the portable terminal acquires;

an identification information transmission step for transmitting the identification information acquired in the identification information acquisition step, from the portable terminal to the information management apparatus;

an output destination information retrieval step for retrieving the information relevant to the output apparatus from the output apparatus information storage means using the information management apparatus, based upon the identification information transmitted in the identification information transmission step; and an information output step for outputting the information to the output apparatus, based upon the information relevant to the particular output apparatus retrieved by the output destination information retrieval step, outputting the information to the particular output apparatus.

Hereby, the information output destination can be specified with ease by acquiring the identification information by the portable terminal in the identification information acquisition step, and transmitting the identification information of the output apparatus to the information management apparatus in the successive identification information transmission step as describe above.

It is preferable in the aforementioned information output method to acquire the identification information of the output apparatus by permitting the portable terminal to undergo near distance radio communication with the output apparatus. As the near distance radio communication there is useable communication with the use of high frequency and infrared rays. Additionally, communication is assured using the Bluetooth.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 7 is a view of example illustrating another example of the information output system.

DESCRIPTION OF THE PREFERRED EMBODIMENTS

In what follows, there will be described a preferred embodiment of an information output system according to the present invention with reference to the accompanying drawings. Same symbols of components described herein as those of same components as those in the description of the accompanied drawings shall be applied thereto, and overlapped description therefore will be omitted.

Figure 1:
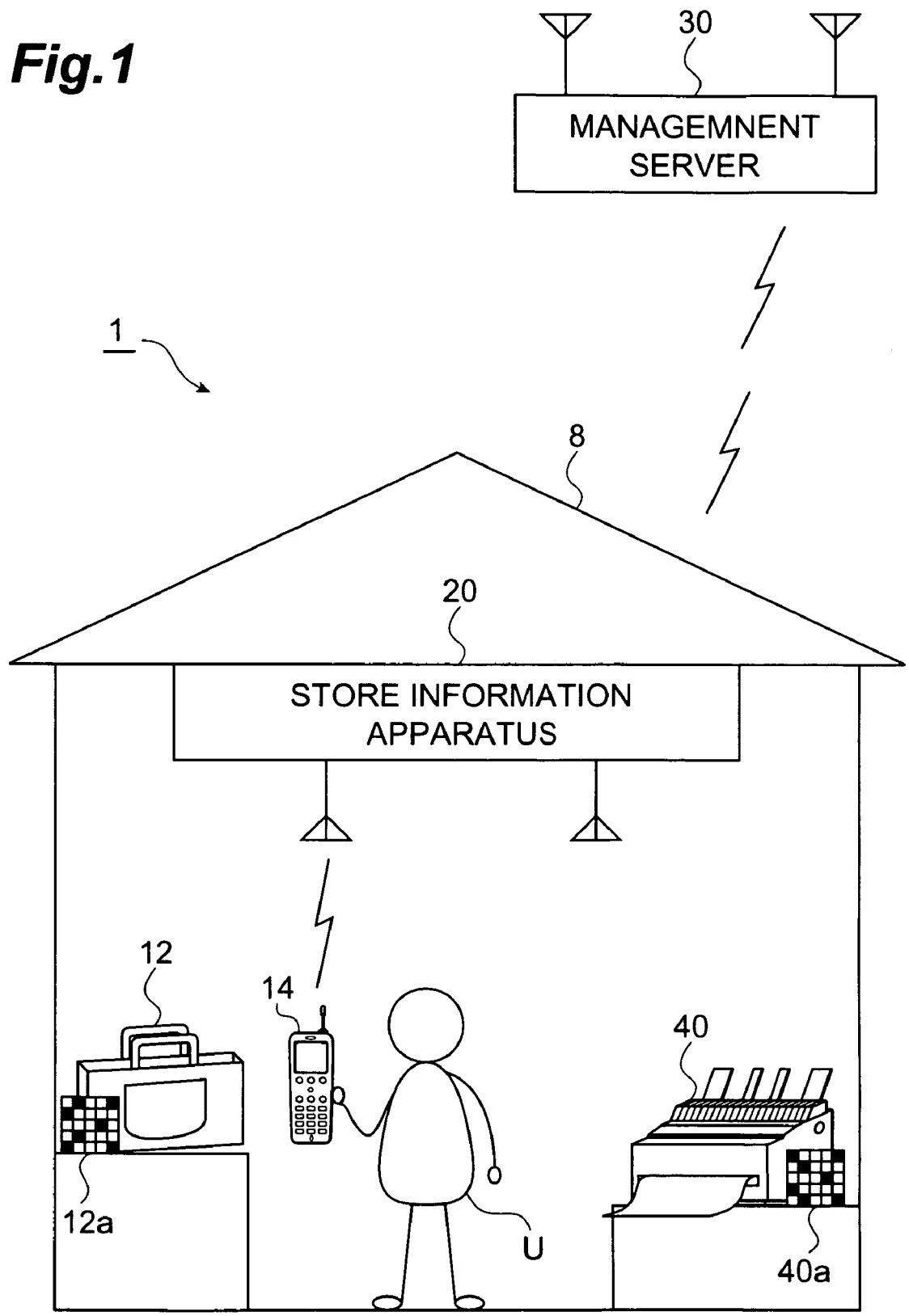
FIG. 1 is a view illustrating the construction of an information output system associated with an embodiment.

As an exemplary information output system 1, there will be described a system for outputting the information of goods sold at a store (bag store) 8. Referring to FIG. 1, there is provided a block diagram illustrating the information output system 1 associated with the present embodiment. The information output system 1 comprises a management server 30 for managing information, a store information apparatus 20, a portable terminal 14 possessed by a user U, and a printer 40 for printing and outputting information. A two-dimensional bar code 12a representative of an ID of goods 12 sold at the store 8 is tagged to the goods 12, and a two-dimensional bar code 40a representative of an ID of a printer 40 installed in the store 8 is tagged to the printer 40. The store information apparatus 20 and the management server 30 in the present embodiment constitute an "information management apparatus" defined in the claims of the present invention. In the following, respective components constituting the information output system 1 associated with the present embodiment will be described.

Figure 2:
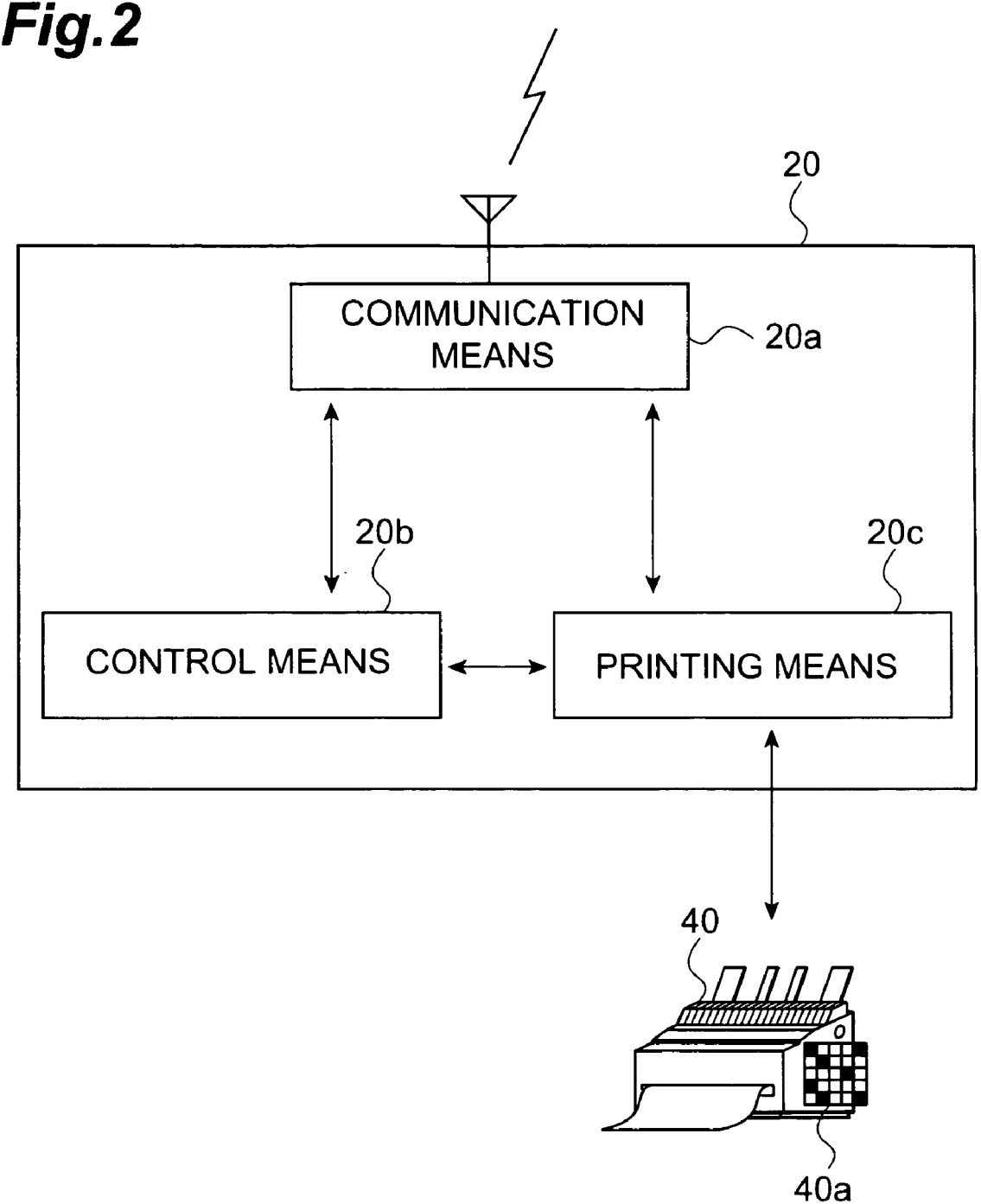
FIG. 2 is a view illustrating the construction of a store information apparatus.

Referring to FIG. 2, there is illustrated the construction of the store information apparatus 20. The store information apparatus 20 comprises communication means 20a, control means 20b, and printing means 20c.

The communication means 20a serves to communicate with the portable terminal 14 of the user U and the management server 30. For the communication means 20a there are useable direct communication to the portable terminal 14 by the near distance radio technique such as the Bluetooth and a technique to communicate with the portable terminal 14 via internet by connecting to Internet capable of intercommunication with the portable terminal 14.

The control means 20b, when receiving image data transmitted from the portable terminal 14 by the communication means 20a, serves to endow the ID of the store information apparatus 20 to the image data, and transmit back it to the communication means 20a. The imaged at a tagged with the ID is transmitted to the management server 30 with the aid of the communication means 20a.

The printing means 20c, when receiving a printing instruction transmitted from the management server 30 through the communication means, serves to output information to the printer 40 based upon the printing instruction. The printing means 20c and the printer 40 maybe connected through wire or radio communication.

Figure 3:
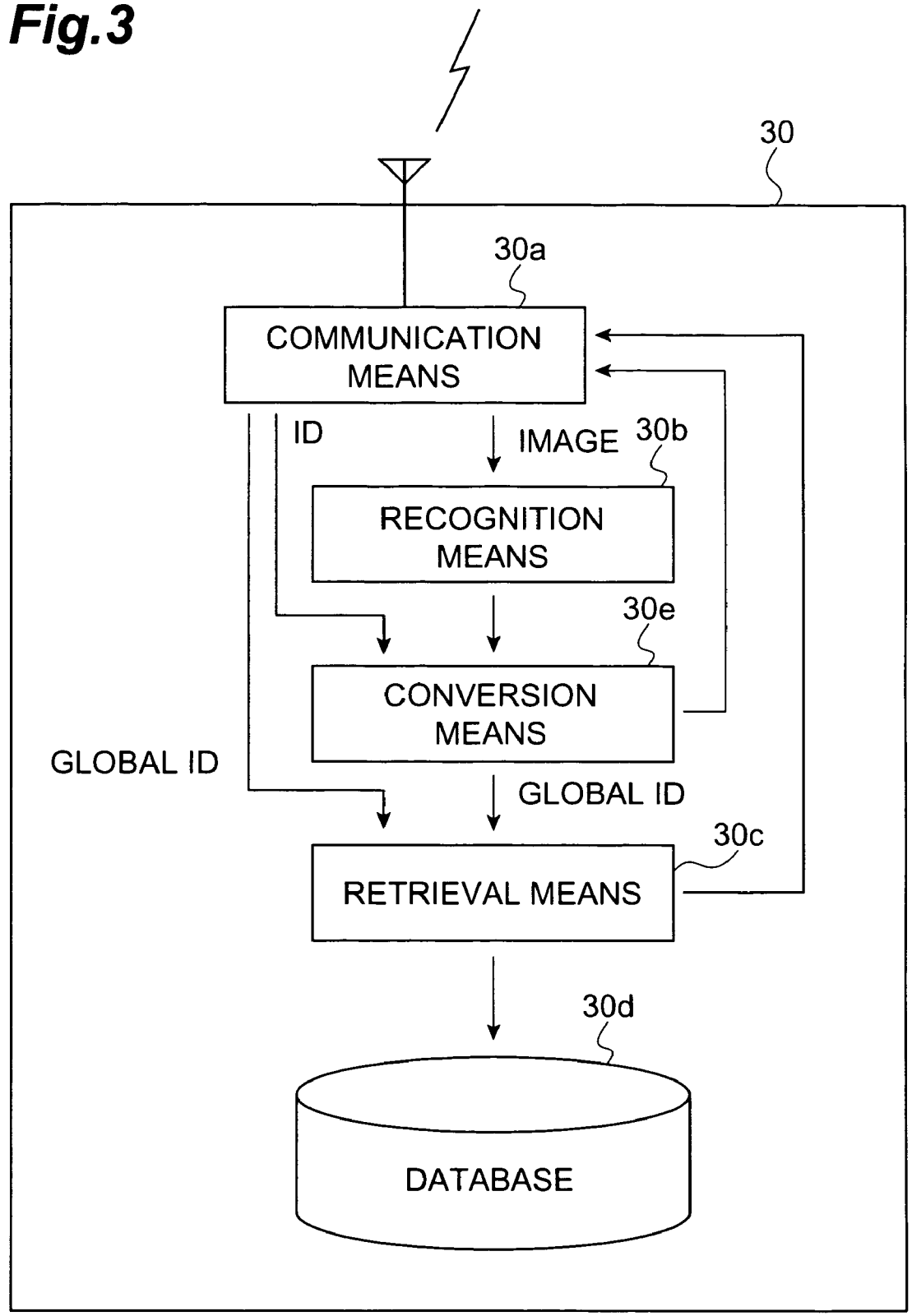
FIG. 3 is a view illustrating the construction of a management server.

Referring to FIG. 3, there is illustrated the construction of the management server 30. The management server 30 comprises communication means 30a, recognition means 30b, conversion means 30e, retrieval means 30c, and a database 30d.

Figure 4:
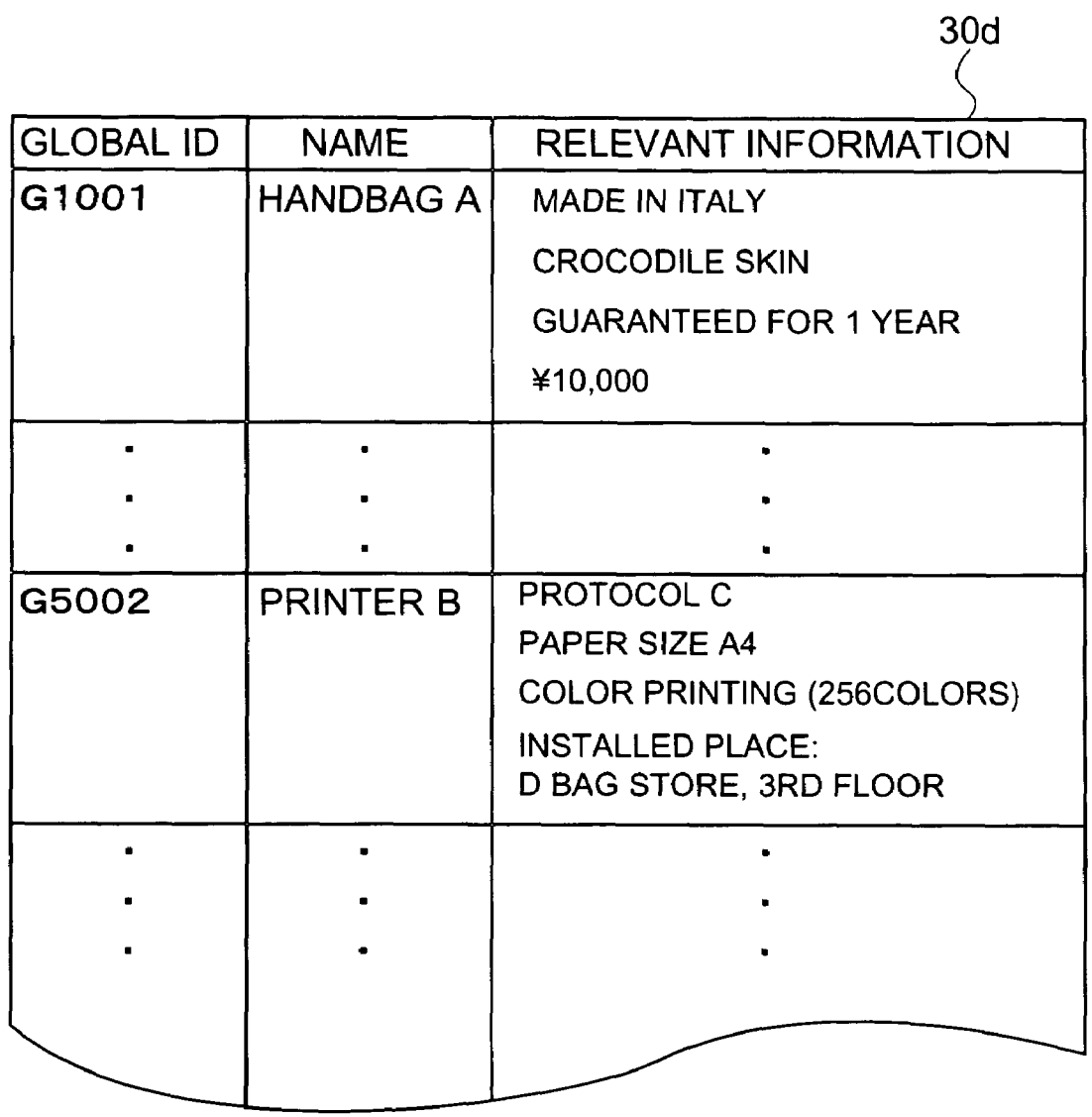
FIG. 4 is a view of example illustrating data stored in a database.

The data base 30d stores the information of an article and the information of a service. These pieces of the information are stored after being linked with a global ID. The "global ID" signifies an ID for uniformly treating varieties of IDs widely used in the world. For example, for books an ID called an ISBN is widely used, and for bar codes an ID system called a JAN code is used. Since varieties of IDs are used in the world in such a manner, the global ID is defined in the information output system 1 associated with the present embodiment in order to uniformly treat varieties of IDs. Varieties of articles such as books, vegetables, bags, stores, hotels, and airplanes can be uniformly treated with use of the global ID. FIG. 4 illustrates an example of data stored in the database 30d. As illustrated in the figure in the data base 30d data such of "global ID", "name", and "relevant information" are stored as found in the example in FIG. 4, the data base 30d stores information of a handbag A and relevant information concerning a printer B. More specifically, the data base 30d stores various pieces of information about goods access information associated with apparatuses for providing services.

The communication means 30a serves to communicate with the store information apparatus 20. For the communication means 30a there can be adopted varieties of conventional communication techniques. For example, it may be radio communication or wire communication using optical fibers and the like.

The recognition means 30b recognizes image data received from the store information apparatus 20 through the communication means 30a, and recognizes an ID represented by a two dimensional bar code involved in the image. More specifically, it serves to analyze the image data to acquire the ID involved in the image data. In the example illustrated in FIG. 1, there are acquired an ID 12a of the handbag 12 and an ID 40a of the printer 40. Although the recognition means 30b is means for recognizing a value indicated by an original two dimensional bar code from an image of a two dimensional bar code, for such recognition means 30b there can be adopted a technique for use in a prior art two dimensional bar code system. It is typically preferable to recognize a two dimensional bar code using a pattern recognition technique for a two dimensional image. It is noticed that when the communication means 30a receives not image data but an ID itself or a global Id itself, processing by the recognition means 30b is not execute.

The conversion means 30e serves to convert an ID recognized by the recognition means 30b to a global ID and output it to the retrieval means 30c. The conversion means 30e has a conversion table referred to upon conversion of a local ID and a global ID defined for every goods.

The retrieval means 30c serves to retrieve the data base 30d as an IFD key converted and inputted through the conversion means 30e, and extract one or more of relevant pieces of information. The retrieval means 30c transmits extracted relevant information to the store information apparatus 20 through the communication means 30a.

There will be described the portable terminal 14. The portable terminal 14 is a terminal comprising photographic means and communication means. The photographic means has the same functions as those of a still camera, a video camera, and a TV telephone, and the communication means can transmit and receive image data. Particularly, provided that the portable terminal serves likewise a video camera capable of photographing a moving image, when a resolution is low, and photographing conditions are bad, a good image can be selected from a plurality of images photographed in a time series, and images can be synthesized to improve reading accuracy for an ID. Provided that it serves likewise a TV telephone, it is preferable because a response whether or not an ID is correctly read can be returned immediately. Although a typical example of the portable terminal 14 is a portable telephone, such an apparatus as a PDA (Personal Digital Assistant) may be good.

Figure 5:
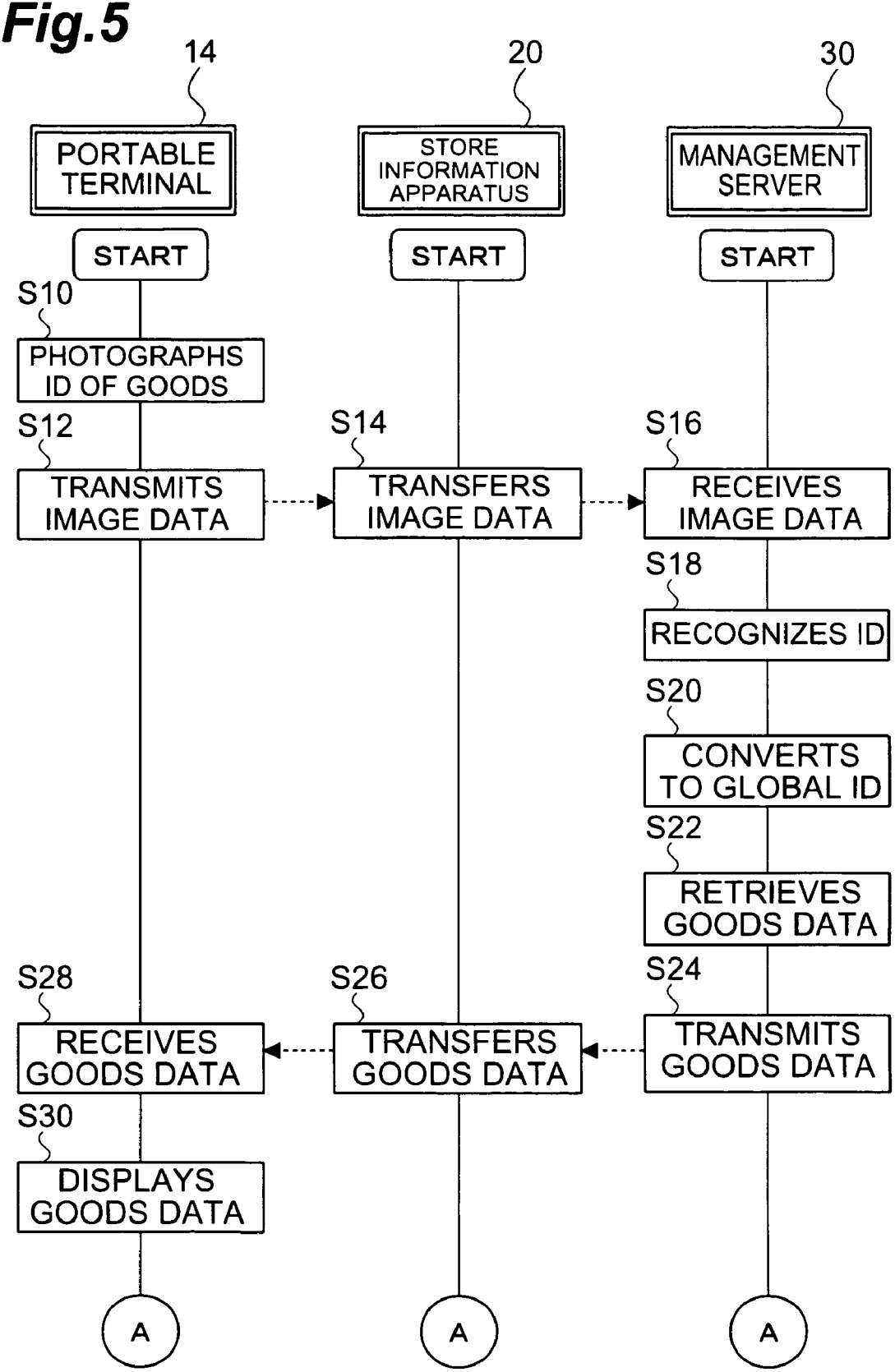
FIG. 5 is a flow chart illustrating the operation of the information output system.
Figure 6:
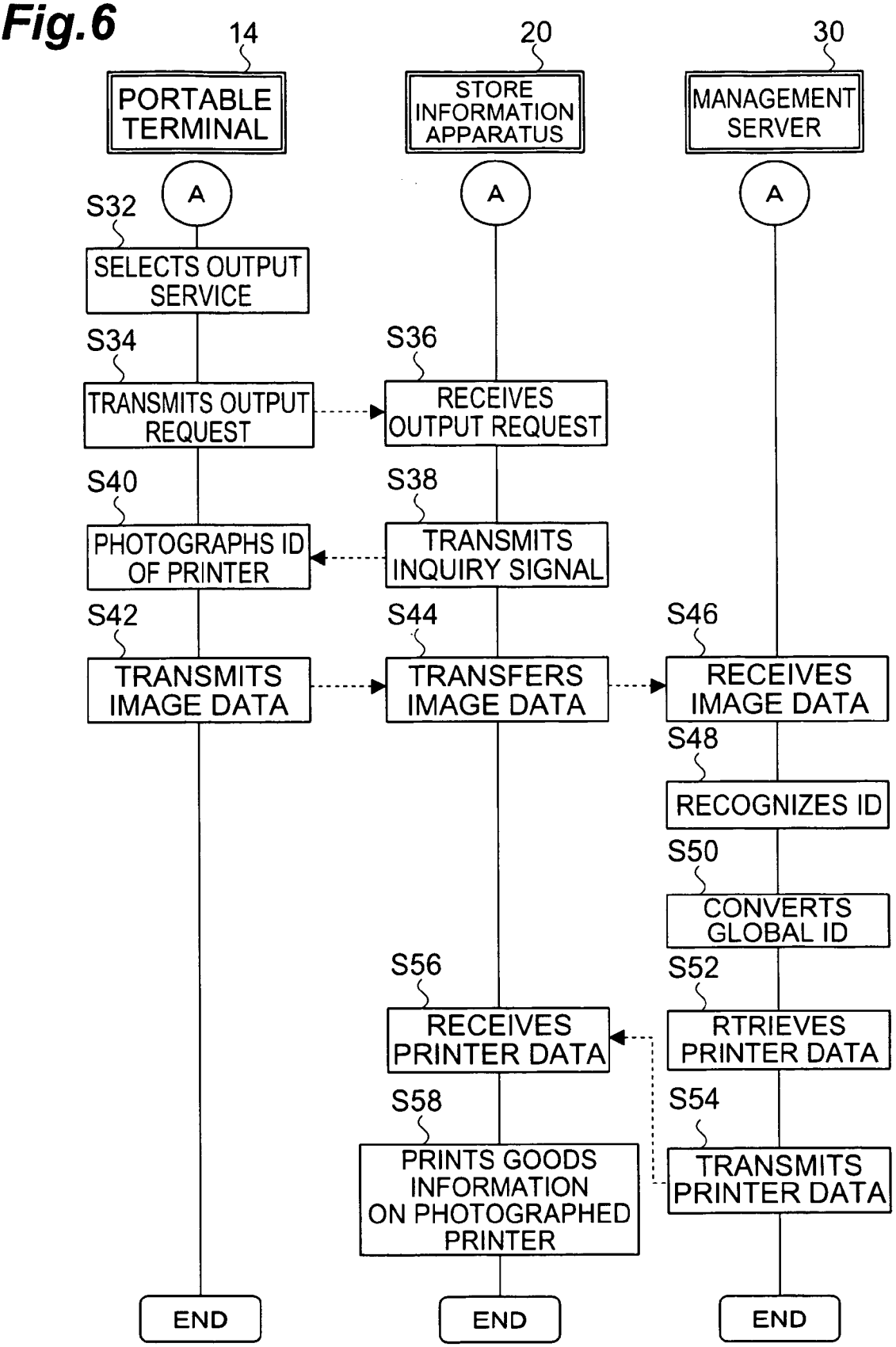
FIG. 6 is a flow chart illustrating the operation of the information output system.

There will be described the operation of the information output system 1 associated with the present embodiment, and an information output method associated with the same embodiment. FIGS. 5 and 6 are flow charts each illustrating the operation of the information output system 1 associated with the present embodiment. In an example described below, there will be described the case where a user U enters a bag store, and make output information concerning handbag arranged in the store 8.

FIG. 5 will first be referred to for the description. There is photographed using photographing means of a portable telephone the two dimensional bar code 12a attached to goods, detailed information of which is desired to be known, here the handbag 12 arranged in the bag store 8 (S10).

The portable terminal 14 transmits the photographed image data to the store information apparatus 20 (S12), and instructs the indoor information apparatus 20 to acquire information relevant to the handbag 12 (a request for requiring information). Thereupon, the portable terminal 14 may tag the image data with an ID of the portable terminal 14, and transmit it to the store information apparatus 20.

The store information apparatus 20, once receiving the image data transmitted from the portable terminal 14, transfers the image data to the management server 30 (S14). In more detail, the store information apparatus 20, once detecting tat the communication means 20a receives the information acquiring request involving the aforementioned image data, tags the received image data with the ID of the store information apparatus 20 with the aid of the control means 20b, and transfers the image data to the management server 30 (S14).

Successively, the management server 30 receives the image data transferred from the store information apparatus 20 (S14), and recognizes the ID involved in the received image data (S18). Then, the management server 30 converts the recognized ID from the image data to a global ID through the conversion means 30e (S20), retrieves the data base 30d employing the converted global ID as a key, and acquires the information relevant to the handbag 12 from the data base 30d (S22).

The management server 30 transmits the acquired data relevant to the handbag 122 (goods data) to the store information apparatus 20 with the aid of the communication means 20a (S24), and the store information apparatus 20 transfers the receive goods data from the management server 30 to the portable terminal 14 (S26). The store information apparatus 20 selects only a service available at the store 8 in the detailed information received from the management server 30 with the aid of the control means 20b, and transmits only the information relevant to the selected service to the portable terminal 14 of the user U. For example, even when there is transmitted information relevant to a handbag made of alligator in Italy, and guaranteed for one year with the price of ¥10,000 (refer to FIG. 4.) from the management server 30, it is possible not to select data relevant to the price of ¥10,000 when the handbag 12 is sold at a discount in the bag store 8. In the present embodiment, since the information management apparatus is constructed, divided into the two sections of the indoor information apparatus 20 and the management server 30, and the detailed information transmitted from the management server 30 is selected by the store information apparatus 20, a service provider can judge what service is actually provided using the store information apparatus, and select the detailed information. More specifically, the management server 30 collectively manages all pieces of information relevant to goods, and the store information apparatus 20 employs the information for each store while customizing it. The management server 20 is hereby useable in itself for another service, and can deal with various services.

The portable terminal 14 receives goods information transmitted from the store information apparatus 20 (S28), and displays the received goods information (S30). It displays also a menu of "output service" for outputting the displayed information together with the goods information.

FIG. 6 is referred to for the further description. Then, once the user U selects the "output service" displayed in the portable terminal 14 (S32), the portable terminal 14 transmits the information output request to the store information apparatus 20 (S34). The store information apparatus 20, once receiving the output request transmitted from the portable terminal 14 (S36), transmits an inquiry signal for inquiring to which printer 40 information is outputted to the portable terminal 14 (S38). The portable terminal 14, once receiving the inquiry signal transmitted from the store information apparatus 20, displayed on the portable terminal 14 that it has received the inquiry signal, and instructs the user U select the printer 40 being an output destination. More specifically, it instructs the user U to photograph a two dimensional bar code tagged on the printer 40 being an output destination (S40). Further, the portable terminal 14 transmits the photographed image data to the store information apparatus 20 (S42).

Once the store information apparatus 20 detects that the communication means 20a has received the image data transmitted from the portable terminal 14 through the control means 20b, the control means 20b transfers the image data received by the communication means 20a to the management server 30 (S44). Successively, the management server 30 receives the image data transmitted from the store information apparatus 20 through the communication means 20a (S46). The management server 30, once receiving the image data transmitted from the store information apparatus 20 (S46), instructs the recognition means 30b to recognize an ID involved in the image data (S48), and converts the recognized ID to a global ID through the conversion means 30e (S50). Then, the management server 30 retrieves the database 30d using the converted global ID as a key, and acquires information (printer information) relevant to the printer 40 from the database 30d (S52).

The management server 30 transmits the retrieved printer information to the store information apparatus 20 (S54). The store information apparatus 20, once detecting the reception of the printer information transmitted from the management server 30 (S56), instructs the printing means 20c to print out goods information based upon the received printer information (S58). The printer information involves a protocol for accessing the printer 40, a paper size capable of outputting the number of colors capable of outputting, and the address of the printer 40.

In accordance with the information output system 1 and the information output method associated with the present embodiment, a user photographs the ID 40a of the goods 12 from which information is desired to be acquired, and photographs the ID 40a of the printer 40, information of which is desired to be outputted. Hereby, it is possible to realize the operation property as if the drag and drop operation is executed on a three-dimensional space.

Although there were described above the embodiments of the present invention with respect to the information output system 1 and the information output method, the present invention is not limited thereto.

Although in the aforementioned embodiment the image data of the ID of the printer 40 was transmitted from the portable terminal 14 in response to the inquiry signal transmitted from the store information apparatus 20, the timing when the portable terminal 14 transmits the image data of the ID of the printer 40 is not limited to that after the inquiry signal was received. For example, the image information of the ID of the printer 40 may be transmitted together with the image information of the ID of the handbag 12. With such a construction it is possible to reduce the number of times of the transmission/reception of data between the store information apparatus 20 and the portable terminal 14.

Although in the aforementioned embodiment there was described the example where the detailed information for the handbag 12 in a bag store was acquired, it is also possible to apply the information output system 1 and the information output method according to the present invention to other goods, for example any article sold in stores such as telephones and table services. More specifically, provided that a two dimensional bar code is tagged to these goods, the same operation as that in the aforementioned embodiment can be executed.

Although in the aforementioned embodiment there was described the example where two-dimensional bar codes are employed as the ID 12a of the goods 12 and the ID 40a of the printer 40, the present invention is not limited to the two-dimensional bar code. It is also preferable to utilize bar codes commonly used at present, the so-called RF-IDs. The RF-ID can usually store a predetermined amount of information therein, and can know the information from the outside in a non-contact manner. Use is made of an ID as this information, which is useable for the present invention. Although In the case of a general bar code the bar code may be photographed with photographing means provided on the portable terminal 14, the bar code may be read by mounting a bar code reader on the portable terminal 14. As other examples excepting such IDs reading for characters by an OCR, and reading for trademarks and sign boards are applicable to the present invention.

Although in the aforementioned embodiment there was described the example of a bag store, the present invention is further applicable to cases where a plurality of stores are assembled such as in a shopping lace. The present invention may be applicable also to pleasure grounds and parks.

Although in the present invention it is generally convenient on the operation that "an object to be outputted" and "a printer to output" are located close to each other, it is not necessarily required that both must be located in the neighborhood. In most extreme case, a printer to output may not exist at a place where an object to be outputted exists. For example, it may allow the printer in an office to output information at another place such as a business. In this situation, there is provided a mechanism for photographing a two-dimensional bar code of the printer 40 in an office, or there is stored a two-dimensional bar code information of the printer 40 in an office in storage means in which image information of an ID photographed in the past is stored as a history. By making use of its information it can be outputted to a printer existent at a remote place. Further, if there is provided storage means for storing an ID photographed in the past, it is convenient that photographing is not required every time of frequently outputting from a printer in a close place.

Although in the aforementioned embodiment the store information apparatus 20 is arranged in the store 8, and the management server 30 is provided separately from the store 8, the management server 30 and the store information apparatus 20 may be constructed in a united manner. This will be described with reference to FIG. 7. FIG. 7 illustrates an example of merging the management server 30 and the store information apparatus 20 as a united information management apparatus 50. There may be constructed the information management apparatus 50 which comprises as illustrated in FIG. 7 a database 30d for storing information of goods and the printer 40, retrieval means 30c for retrieving the data base 30d, recognition means 30b for recognizing an ID from image data, conversion means 30e for converting the ID recognized by the recognition means 30b to a global ID, communication means 20a for communication with the portable terminal 14, and printing means 20c for instructing the printer 40 to print and output information. With such a construction, goods information can be outputted to the designated printer 40 based upon image data transmitted from the portable terminal 14 likewise the information output system 1 associated with the aforementioned embodiment. In the aforementioned embodiment, the information management apparatus 50 illustrated in FIG. 7 is divided into two components 20, 30 as the store information apparatus 20 and the management server 30.

Further, in the aforementioned embodiment the store information apparatus 20 has a function as an intermediate with the management server 30 with respect to retrieval for goods information, and a function to print on the basis of print information transmitted from the management server 30. Independent apparatuses may achieve each of these two functions respectively. For example, another information apparatus for performing a print service may achieve printing function or another print service site on an Internet may be utilized. The construction is an example of the function of the information management apparatus 50 illustrated in FIG. 7 being divided further finer. It is possible in such a manner to freely change how the function of the information management apparatus 20 is divided and constructed.

Although in the aforementioned embodiment information of goods and the printer 40 is stored in the database 30d linking with a global ID, it is not necessarily required to employ such a global ID. Any information may be stored linking it to an ID defined for every goods and the printer 40. When the global ID is not used, a data base may be provided for storing related information for every kind of goods.

Although in the aforementioned embodiment there was described as a method for acquiring the identification information of a printer the method for photographing an ID tagged to a printer with the photographing means of the portable terminal, there is considered another method for acquiring identification information. For example, identification information of a printer may be acquired by performing communication between the printer and the portable terminal using high frequency waves and infrared rays. It is possible to specify a printer being an information output destination by transmitting the acquired identification information from the portable terminal to the store information apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A portable terminal including photographing means comprising:

output request transmission means for transmitting an output request for information to an information management apparatus which allows an output apparatus to output the information;

inquiry signal receiving means for receiving an inquiry signal transmitted from said information management apparatus in response to said output request for inquiring said portable terminal of an output apparatus for an output destination; and image data transmission means for transmitting identification information tagged to said output apparatus for identifying this particular output apparatus and image data photographed with said photographing means to said information management apparatus, when an inquiry signal is received by said inquiry signal receiving means.

2. The portable terminal according to claim 1 wherein, said image data transmission means transmits identification information tagged to goods for identifying this particular goods and image data photographed with said photographing means to said information management apparatus.

3. A portable terminal comprising:

photographing means for photographing identification information to obtain image data, said identification information being tagged to an output apparatus for identifying this particular output apparatus; and output request transmission means for transmitting image data photographed by said photographing means and an output request for information to an information management apparatus which allows to output information.

4. An information outputting method in an information output system having an output apparatus for outputting goods information and an information management apparatus connecting each other through a network, in which the information management apparatus includes an output apparatus information storage means for storing information relevant to said output apparatus and goods information storage means for storing information relevant to goods, and specifies an output apparatus to output information based upon information transmitted from a portable terminal, the method comprising:

a first image data transmission step for transmitting image data of identification information tagged to goods for identifying it, photographed by said portable terminal, to said information management apparatus receiving it;

a first identification information acquisition step for analyzing image data received by said information management apparatus in said first image data transmission step, and for acquiring the identification information of the goods involved in said image data;

goods information retrieval step for retrieving the information relevant to said goods from said goods information storage means using said information management apparatus, based upon the identification information acquired in said first identification information acquisition step;

an output request transmission step for transmitting an output request for the information relevant to said goods using said portable terminal to said information management apparatus receiving it;

an inquiry signal transmission step for transmitting an inquiry signal for inquiring said portable terminal of an output apparatus for an output destination, from said information management apparatus to said portable terminal receiving it, when said information management apparatus receives the inquiry signal in said output request transmission step;

a second image data transmission step for transmitting image data of identification information tagged to an output apparatus for identifying it, photographed by said portable terminal, to said information management apparatus receiving it, when said portable terminal receives the inquiry signal in said inquiry signal transmission step;

a second identification information acquisition step for analyzing image data received by said information management apparatus in said second image data transmission step, and for acquiring the identification information of the goods involved in said image data;

an output destination information retrieval step for retrieving the information relevant to said output apparatus from said output apparatus information storage means using said information management apparatus, based upon the identification information acquired in said second identification information acquisition step; and an information output step for outputting the information relevant to the goods, retrieved in said goods information retrieval step, using said information management apparatus, based upon the information relevant to the particular output apparatus retrieved by said output destination information retrieval step, outputting the information to said particular output apparatus.

5. An information outputting method in an information output system having an output apparatus for outputting information and an information management apparatus connecting each other through a network, in which the information management apparatus includes an information storage means for storing information relevant to said output apparatus and to goods, linking global identification information uniformly tagged to any output apparatus and to different kinds of goods, and specifies an output apparatus to output information based upon information transmitted from a portable terminal, the method comprising:

a first image data transmission step for transmitting image data of identification information tagged to goods for identifying it, photographed by said portable terminal, to said information management apparatus receiving it;

a first identification information acquisition step for analyzing image data received by said information management apparatus in said first image data transmission step, and for acquiring the identification information of the goods involved in said image data;

a first converting step for converting identification information of the goods acquired in said first identification information acquisition step into global identification information;

a first information retrieval step for retrieving the information relevant to said goods from said information storage means using said information management apparatus, based upon the global identification information converted in said first converting step;

an output request transmission step for transmitting an output request for the information relevant to said goods using said portable terminal to said information management apparatus receiving it;

an inquiry signal transmission step for transmitting an inquiry signal, for inquiring said portable terminal of an output apparatus for an output destination, from said information management apparatus to said portable terminal receiving it, when said information management apparatus receives the inquiry signal in said output request transmission step;

a second image data transmission step for transmitting image data of identification information tagged to an output apparatus for identifying it, photographed by said portable terminal, to said information management apparatus receiving it, when said portable terminal receives the inquiry signal in said inquiry signal transmission step;

a second identification information acquisition step for analyzing image data received by said information management apparatus in said second image data transmission step, and for acquiring the identification information of the output apparatus involved in said image data;

a second converting step for converting the identification information of the output apparatus acquired in said second identification information acquisition step into global identification information;

a second information retrieval step for retrieving the information relevant to said output apparatus from said information storage means using said information management apparatus, based upon the global identification information converted in said second converting step; and an information output step for outputting the information relevant to the goods, retrieved in said first information retrieval step, using said information management apparatus, based upon the information relevant to the particular output apparatus retrieved by said output destination information retrieval step, outputting the information to said particular output apparatus.

6. An information outputting method in an information output system having an output apparatus for outputting information and an information management apparatus connecting each other through a network, in which the information management apparatus includes an output apparatus information storage means for storing information relevant to said output apparatus and specifies an output apparatus to output information based upon information transmitted from a portable terminal, the method comprising:

an image data photographing step for obtaining image data of identification information tagged to an output apparatus identifying it, photographed by said portable;

an output request transmission step for transmitting the image data photographed in said image data photographing step and an output request for information, from said portable terminal to said information management apparatus receiving them;

an identification information acquisition step for analyzing the image data transmitted in said output request transmission step, and for acquiring the identification information of the output apparatus involved in said image data;

an output destination information retrieval step for retrieving the information relevant to said output apparatus from said output apparatus information storage means, based upon the identification information acquired in said identification information acquisition step; and an information output step for outputting the information to the output apparatus, based upon the information relevant to the particular output apparatus retrieved by said output destination information retrieval step, outputting the information to said particular output apparatus.

* * * * *